May 6, 1952     R. F. WOLFINGER     2,595,435
POULTRY PLUCKING MECHANISM
Filed May 26, 1944     2 SHEETS—SHEET 1
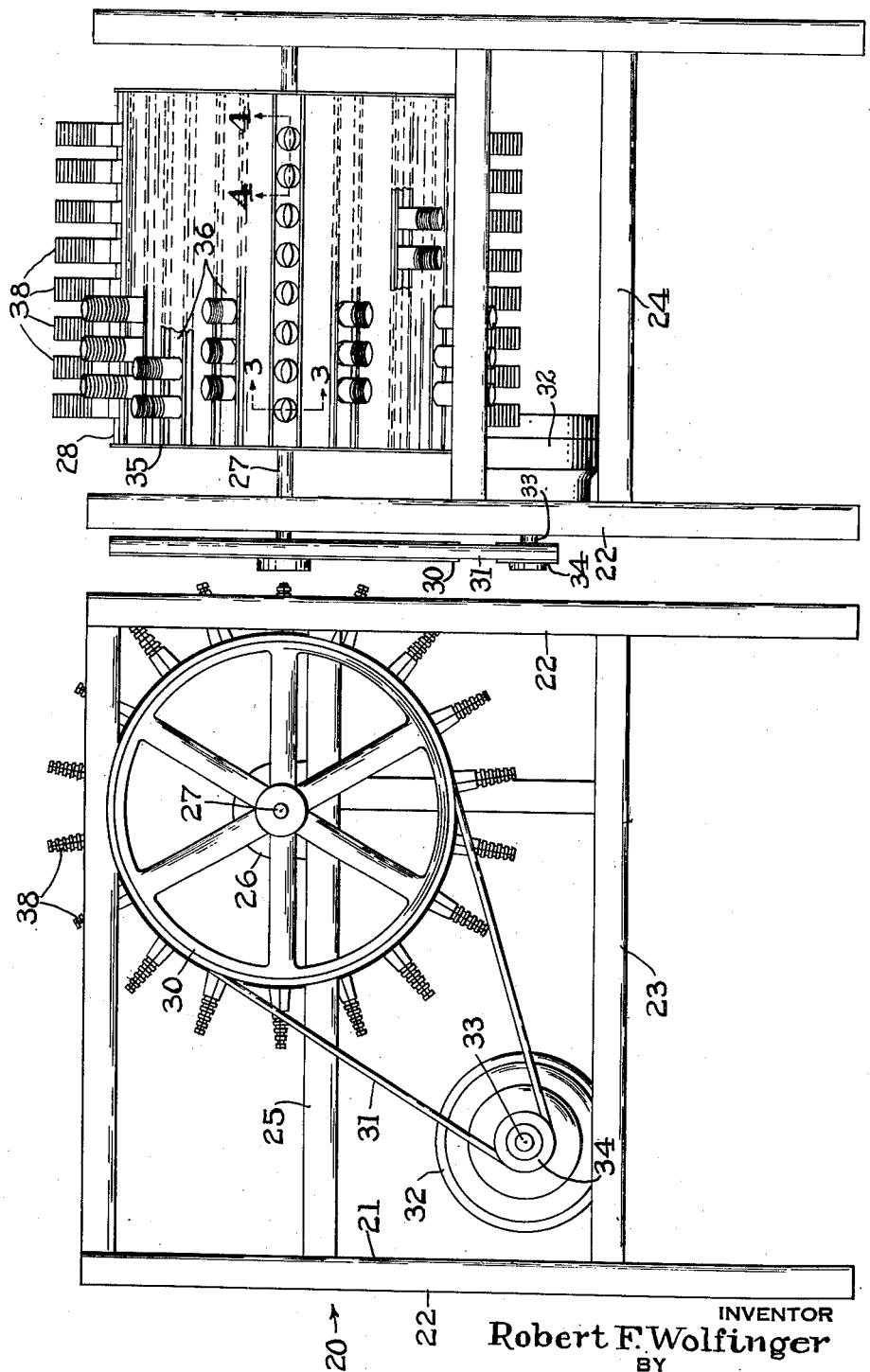
INVENTOR
Robert F. Wolfinger
BY
Warren H. F. Schmieding
ATTORNEY May 6, 1952

R. F. WOLFINGER 2,595,435

POULTRY PLUCKING MECHANISM

Filed May 26, 1944

INVENTOR
Robert F. Wolfinger
BY
Warren H. F. Schmieding
ATTORNEY

Patented May 6, 1952

2,595,435

UNITED STATES PATENT OFFICE 2,595,435

POULTRY PLUCKING MECHANISM

Robert F. Wolfinger, Delaware, Ohio, assignor, by direct and mesne assignments, to Warren H. F. Schmieding, Columbus, Ohio Application May 26, 1944, Serial No. 537,483

18 Claims. (Cl. 17—11.1)

This invention relates to mechanism for removing feathers from fowls and more particularly to resilient plucking fingers employed on such mechanism.

One object of this invention is to provide a machine having a rotary drum from which a plurality of flexible picking elements project which may be frictionally engaged with the feathers of a fowl to separate them from the body of the fowl, the fingers being so shaped as to be more flexible in the direction of rotation of the drum than at an angle thereto and to be capable of substantial contact with the fowl so that the machine will possess a high degree of efficiency.

Another object of this invention is to provide a poultry plucking machine having a rotary drum with circumferentially spaced rows of plucking fingers with oval cross sections, the size of the fingers being such that they will possess the optimum degree of flexibility for the removal of feathers from the fowl held thereagainst during the rotation of the drum.

A further object of the invention is to provide a machine for removing feathers having a rotatable drum with plucking fingers projecting therefrom, the fingers having portions with oval cross sections, the fingers being so secured to the drum that the greatest dimensions of the oval sections extend transversely of the drum whereby the fingers will possess flexibility in planes parallel to the direction of rotation of the drum.

A still further object of the invention consists in providing a plucking finger formed from resilient or flexible material such as rubber and having a relatively long body with a cylindrical cross section at the base end, the cross section gradually converging into an oval at the outer end, the length of the oval end which corresponds to the width of the finger being substantially equal to the diameter of the finger at the base end. This construction gives the finger the greatest degree of flexibility at the outer end where it is needed and the greatest degree of strength at the end where it is attached to the drum.

Another object is to provide the plucking finger mentioned in the preceding paragraph with a disk-like head at the cylindrical base end which head is spaced from the body by a groove in order that the body may be inserted in an opening in the drum of a plucking machine and retained therein during use by the disk-like head.

It is an object also to provide a plucking finger having a portion with an oval cross section which gradually decreases in thickness toward the outer end of the finger, the front and/or rear surfaces of the finger being provided with transversely extending grooves spaced longitudinally of the oval portion to provide ribs with relatively sharp edges which assist in gripping the feathers to effect their removal from the body of the fowl.

Another object is to terminate the grooves in the plucking finger mentioned in the preceding paragraph adjacent the side edges of the finger in order to retain the full width of the finger body throughout its complete length and thus avoid weakening or otherwise deleteriously affecting the finger.

Further objects and advantages of the present invention will be apparent from the following description, reference being had to the accompanying drawings wherein a preferred form of embodiment of the invention is clearly shown.

In the drawings:

Fig. 1 is an elevational view of a feather removing machine embodying the principles of the present invention.

Fig. 2 is an end elevational view of the machine shown in Fig. 1;

Figure 3:
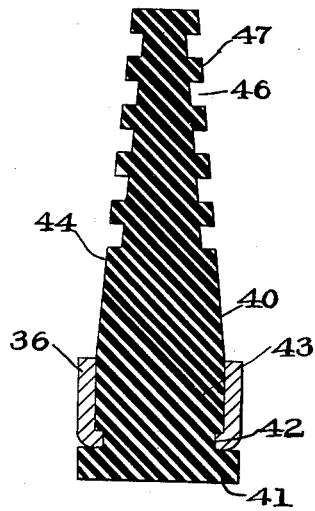
Fig. 3 is a detailed vertical sectional view taken through a plucking finger used in the machine on the plane indicated by the line 3—3 of Fig. 2.

The poultry plucking machine 20 forming the present invention includes a frame 21 which may be formed of any suitable material such as angle iron or wooden bars. This frame 21 comprises vertical corner posts 22 joined by longitudinally and transversely extending horizontal bars 23 and 24, respectively. One set of longitudinally extending bars 25 are provided with bearings 26 to rotatably support a shaft 27 on which a drum 28 is carried. This drum is secured to the shaft 27 to rotate in unison therewith. One end of the shaft 27 also carries a large pulley 30 to receive an endless belt 31 by which rotary movement is transmitted to the pulley 30 from an electric motor 32. This electric motor 32 is merely indicative of one type of prime mover which might be employed to operate the machine, any other type of prime mover being equally suitable for such purpose.

The armature shaft 33 of the motor 32 is also provided with a pulley 34 of reduced size to receive the belt 31, a small pulley being employed to effect a speed reduction between the motor 32 and the drum 28. The motor 32 is mounted on the lowermost longitudinally extending frame bars 23 adjacent to one end of the machine 20. When the motor is supplied with electric current, the shaft 33 will revolve and this rotary motion will be transmitted by the belt 31 to the pulley 30 and shaft 27. Since the drum 28 is rigidly secured to the shaft 27, the drum will also revolve to effect the removal of feathers from the bodies of fowls.

The drum 28 includes side members 35 which are spaced longitudinally of the shaft 27 and constitute end members for the drum. A plurality of circumferentially spaced channels 36 extend longitudinally of the drum and are secured between the end members 35 to complete the frame of the drum. These channels 36 are provided at longitudinally spaced points with openings 37 for the reception of plucking fingers 38. The openings in adjacent bars are staggered so that the plucking fingers will be likewise positioned and, therefore, as the drum rotates the entire area of the body presented to the drum will be contacted by the fingers. Due to this feature of construction the machine will be more apt to clean the body of a fowl without missing any of the feathers.

Figure 4:
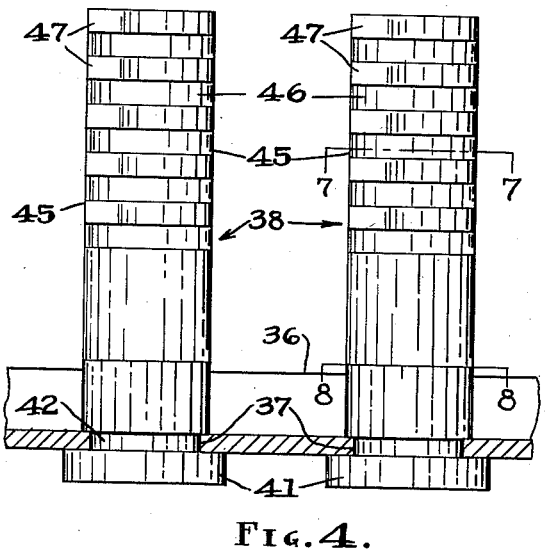
Fig. 4 is a detailed longitudinal sectional view taken through a channel forming part of the drum of the machine, showing a pair of plucking fingers in front elevation.
Figure 5:
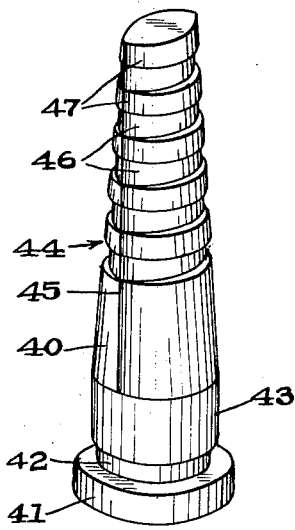
Fig. 5 is a perspective view of a plucking finger.

As illustrated in Figs. 3-5, inclusive, each plucking finger 38 includes a body 40 which is preferably formed from rubber or composition material having similar characteristics, one of the essential features being flexibility. Each body 40 includes a circular head 41 at the inner end for retaining the body within a channel opening 37, a reduced neck 42 which connects the head 41 with the rest of the body 40, a cylindrical section 43 which lies within the channel 36, and a tapering outer body engaging portion 44. It will be noted by a comparison of Figs. 3 and 4 that the portion 44 tapers only at the front and rear surfaces, the side edges 45 as shown in Figs. 2, 4, 6, 7 and 8 being parallel.

Figure 6:
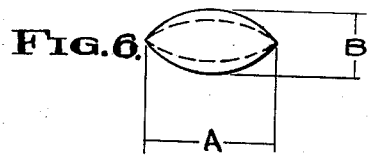
Fig. 6 is a plan view of the outer end of a plucking finger.
Figure 7:
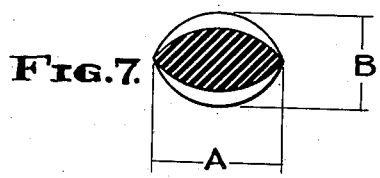
Fig. 7 is a horizontal sectional view taken on the plane indicated by the line 7—7 of Fig. 4.
Figure 8:
Fig. 8 is a similar view on the plane indicated by the line 8—8 of Fig. 4.

The portion 44 gradually changes in cross sectional form from round at the juncture of portion 44 with the cylindrical portion 43, to a relatively narrow ellipse having pointed ends at the extremity of the portion 44. As shown in Figs. 6 and 7, the portion 44 will have oval or elliptical cross sections of different shapes throughout its length, the length A of the oval or elliptical sections being equal while the width B gradually decreases toward the outer end of the finger. This construction provides the fingers with gradually decreasing thicknesses toward the outer end whereby the outer extremities will be more flexible than the inner portions, thus the fingers will be strong at the points of connection with the drum where strength is needed and flexible at the outer end where the fowl bodies are contacted. Since the fingers 38 retain their full width throughout their length, more area of the front surfaces will be exposed for contact with the body from which the feathers are being removed than if the fingers were cylindrical or tapered on all sides.

This retention of the full width also renders the fingers more flexible in a direction parallel to the direction of rotation than in directions transverse thereto.

The front and rear surfaces of fingers 38 have transversely extending, spaced grooves 46 formed therein, these grooves starting at the side edges of the fingers and gradually increasing in depth toward the centers of the front and rear faces. These grooves provide ribs 47 therebetween, which have relatively sharp edges to grip the feathers and effect their removal from the body of the fowl pressed against the fingers during the rotation of the drum. The grooves also serve to decrease the thickness of the outer portions of the fingers and increase the flexibility of these members. Since no ribs are necessary at the sides of the fingers, the grooves terminate at the side edges of the bodies and thus prevent a reduction in transverse strength. The fingers are, thereby, provided with straight, smooth, side edges which will facilitate the insertion of the fingers into the openings 37 in the channels 36.

These plucking fingers operate equally well whether the fowl has been scalded at high or lower temperatures or is permitted to remain dry.

While the form of embodiment of the present invention as herein disclosed constitutes a preferred form, it is to be understood that other forms might be adopted, all coming within the scope of the claims which follow.

I claim:

1. In a poultry plucking machine of the type having a power driven rotor, a plurality of circumferentially spaced flexible fingers projecting from said rotor, each of said fingers comprising a resilient body having a portion with a substantially oval cross section, the major axis of the oval of said cross section extending parallel to the axis of rotation of said rotor.

2. In a poultry plucking machine of the type having a power driven rotor, a plurality of circumferentially spaced flexible fingers projecting from said rotor, each of said fingers comprising a resilient body with oppositely disposed parallel side edges and outwardly converging convex front and rear surfaces.

3. In a poultry plucking machine of the type having a power driven rotor, a plurality of circumferentially spaced flexible fingers projecting from said rotor, each of said fingers comprising a resilient body with oppositely disposed parallel side edges and outwardly converging convex front and rear surfaces, one of said surfaces being provided with transversely extending spaced ribs.

4. In a poultry plucking machine of the type having a power driven rotor, a plurality of circumferentially spaced flexible fingers projecting from said rotor, each of said fingers comprising a resilient body with oppositely disposed parallel side edges and outwardly converging convex front and rear surfaces, said front and rear surfaces being provided with transversely extending spaced ribs.

5. A poultry plucking finger comprising an elongated resilient body having a substantially cylindrical end portion and an end portion with an oval cross section, the length of the major axis of the oval of said cross section being substantially equal to the diameter of said cylindrical end.

6. A poultry plucking finger comprising an elongated resilient body having a cylindrical end portion formed for attachment to a rotor, the major portion of said body being oval in cross section, the minor axis of said oval gradually decreasing in length toward the outer end of said finger.

7. A poultry plucking finger comprising an elongated resilient body having a cylindrical end portion formed for attachment to a rotor, the major portion of said body being oval in cross section, the minor axis of said oval gradually decreasing in length toward the outer end of said finger; and transversely extending spaced ribs provided on the outer portion of said body.

8. A poultry plucking finger comprising an elongated resilient body having a cylindrical end portion formed for attachment to a rotor, the major outer portion of said body being oval in cross section, the minor axis of said oval gradually decreasing in length toward the outer end of said major outer portion; and transversely extending ribs spaced longitudinally of the major outer portion of said body, said ribs diminishing in thickness toward the side edges of said body.

9. A poultry plucking finger comprising an elongated resilient body having a circular cross section adjacent one end, the cross sectional formation of said body changing gradually to oval at the opposite end; and a plurality of transversely extending ribs spaced longitudinally of said body, said ribs terminating at the ends of the major axis of the oval.

10. A poultry plucking finger comprising an elongated resilient body having a substantially cylindrical end portion and an oval end portion, the major axis of said oval portion being substantially equal to the diameter of said cylindrical end, said body having a disk-like head on the cylindrical end portion.

11. A poultry plucking finger comprising an elongated resilient body having a substantially cylindrical end portion and an end portion with an oval cross section, the major axis of the oval of said cross section being substantially equal to the diameter of said cylindrical end, said body having an enlarged disk-like head on the cylindrical end portion, said head being spaced from the cylindrical body portion by a groove.

12. In a poultry plucking machine of the type having a power driven rotor with a plurality of circumferentially spaced holes in the periphery thereof, a finger disposed in each hole in said rotor and adapted to be rotated therewith for removing feathers from the bodies of fowl, each of said fingers having a flexible body with a head at its inner end for retaining the fingers within said rotor, said body possessing a substantially oval cross sectional formation which decreases in thickness from the inner to the outer portion of said finger, and the major axis of said cross sectional formation extending parallel to the axis of rotation of said rotor.

13. In a poultry plucking machine of the type having a power driven rotor with a plurality of circumferentially spaced holes in the periphery thereof, a finger disposed in each hole in said rotor and adapted to be rotated therewith for removing feathers from the bodies of fowl, each of said fingers having a flexible body with a head at its inner end for retaining the fingers within said rotor, said body possessing a substantially oval cross sectional formation which decreases in thickness from the inner to the outer portion of said finger, the major axis of said cross sectional formation extending parallel to the axis of rotation of said rotor, and a plurality of transversely extending ribs spaced longitudinally of the front and rear surfaces of said body.

14. A poultry plucking finger comprising an elongated resilient body having an elliptical cross section which changes substantially constantly from the base end to the outer end thereof, the major axes of elliptical cross sections taken any place throughout the length of said body being equal, the minor axes of such elliptical cross section decreasing from the base to the outer end of said body.

15. A poultry plucking finger of the type set forth in claim 14 provided with longitudinally spaced transversely extending grooves in the front and rear surfaces.

16. In a poultry plucking machine of the type having a power driven rotating drum, a plurality of flexible plucking fingers projecting circumferentially from said drum in a staggered spaced relation to provide for contacting the entire area of the body to be plucked, each of said fingers comprising a body having a portion with a substantially elliptical cross section, the major axis of said cross sectional portion extending parallel to the axis of rotation of said drum.

17. A poultry picking finger formed of resilient material comprising a base portion for attachment to a poultry picking machine, and a working portion for striking poultry to remove feathers therefrom, said working portion being substantially elliptical in cross-section, said cross-sectional area of said working portion decreasing in its minor elliptical axis as it extends away from said base portion.

18. In a poultry picking machine of the rotating drum and finger type, a poultry picking finger therefor comprising a base portion for attachment to said drum and a finger portion of decreasing oval cross-section as it extends outwardly from said base portion.

ROBERT F. WOLFINGER.

REFERENCES CITED

The following references are of record in the file of this patent:

UNITED STATES PATENTS

| Number | Name | Date |
|---|---|---|
| 2,235,619 | McMahon et al. | Mar. 18, 1941 |
| 2,300,157 | Hunt | Oct. 27, 1942 |
| 2,302,525 | Campbell | Nov. 17, 1943 |
| 2,342,013 | Sandlin | Feb. 15, 1944 |
| 2,358,693 | DuPuy | Sept. 19, 1944 |

FOREIGN PATENTS

| Number | Country | Date |
|---|---|---|
| 116,500 | Australia | Jan. 27, 1943 |